(12) United States Patent  
Xu

(10) Patent No.: US 12,461,848 B2
(45) Date of Patent: Nov. 4, 2025

(54) MEMORY PAGING METHOD AND SYSTEM, AND STORAGE MEDIUM

(71) Applicant: HANGZHOU ALICLOUD FEITIAN INFORMATION TECHNOLOGY CO., LTD., Hangzhou (CN)

(72) Inventor: Yun Xu, Hangzhou (CN)

(73) Assignee: HANGZHOU ALICLOUD FEITIAN INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/685,060

(22) PCT Filed: Feb. 3, 2023

(86) PCT No.: PCT/CN2023/074406
§ 371 (c)(1),
(2) Date: Feb. 20, 2024

(87) PCT Pub. No.: WO2023/155694
PCT Pub. Date: Aug. 24, 2023

(65) Prior Publication Data
US 2024/0281365 A1    Aug. 22, 2024

(30) Foreign Application Priority Data
Feb. 18, 2022  (CN) .......................... 202210150479.1

(51) Int. Cl.
G06F 12/00    (2006.01)
G06F 3/06     (2006.01)
(Continued)

(52) U.S. Cl.
CPC ............ G06F 12/023 (2013.01); G06F 3/061 (2013.01); G06F 3/0655 (2013.01);
(Continued)

(58) Field of Classification Search
None
See application file for complete search history.

(56) References Cited

U.S. PATENT DOCUMENTS 10,691,365 B1 *  6/2020  Tsirkin ................... G06F 12/10
2014/0298330 A1 * 10/2014  Suzuki ............... G06F 9/45558
                                                            718/1
(Continued)

FOREIGN PATENT DOCUMENTS

CN    103597451 A    2/2014
CN    111966468 A    11/2020
(Continued)

OTHER PUBLICATIONS

Xu, Yu, "Optimization of Mediated Pass-Through for on-Device MMU Virtualization", Shanghai Jiao Tong University, Shanghai, China, Mar. 10, 2018 (82 pages).
(Continued)

*Primary Examiner* — Daniel D Tsui
(74) *Attorney, Agent, or Firm* — Clark Hill PLC

(57) ABSTRACT

A memory paging method and system, and a storage medium are provided. In the embodiments of the present application, for an IOMMU which does not support Page fault, a VMM may determine a GPA needing page update, and determine a first HPA corresponding to the GPA from a page table stored in the IOMMU of a host; determine a second HPA for replacing the first HPA from idle physical addresses stored in a host memory; further, copy data stored in the first HPA to the second HPA; and update a HPA that corresponds to the GPA needing update and is recorded in the page table of the IOMMU to the second HPA, and thus, page table replacement is implemented for the IOMMU which does not support Page fault.

15 Claims, 2 Drawing Sheets

(51) Int. Cl.
*G06F 9/455* (2018.01)
*G06F 12/02* (2006.01)

(52) U.S. Cl.
CPC ........ *G06F 3/0679* (2013.01); *G06F 9/45558* (2013.01); *G06F 2009/45583* (2013.01); *G06F 2212/72* (2013.01)

(56) References Cited

U.S. PATENT DOCUMENTS

| | | | |
|---|---|---|---|
| 2018/0011797 | A1 | 1/2018 | Shi et al. |
| 2018/0373556 | A1 | 12/2018 | Tian et al. |
| 2023/0418644 | A1* | 12/2023 | Tsirkin ................ G06F 9/45558 |

FOREIGN PATENT DOCUMENTS

| | | |
|---|---|---|
| CN | 112241310 A | 1/2021 |
| CN | 112925606 A | 6/2021 |
| CN | 114201269 A | 3/2022 |

OTHER PUBLICATIONS

PCT International Search Report for PCT/CN2023/074406 entitled "Memory Paging Method and System, and Storage Medium" mailed Jun. 23, 2023 (6 pages including English-language translation).

First Office Action issued Apr. 2, 2022 in CN Application No. 202210150479.1 entitled "Memory Paging Method, System and Memory" (10 pages including English-language translation).

Second Office Action issued May 5, 2022 in CN Application No. 202210150479.1 entitled "Memory Paging Method, System and Memory" (12 pages including English-language translation).

PCT International Written Opinion for PCT/CN2023/074406 entitled "Memory Paging Method and System, and Storage Medium" mailed Jun. 23, 2023 (4 pages).

Extended European Search Report of European Patent Application No. 23755697.2 based on PCT/CN2023/074406, entitled "Memory Scanning Method and Apparatus," dated Jun. 30, 2025 (10 pages).

* cited by examiner

MEMORY PAGING METHOD AND SYSTEM, AND STORAGE MEDIUM

This is an application under 35 U.S.C. § 371 of International Application No. PCT/CN2023/074406 filed Feb. 3, 2023, entitled "MEMORY PAGING METHOD AND SYSTEM, AND STORAGE MEDIUM", which claims priority to Chinese patent application No. 202210150479.1, filed on Feb. 18, 2022 with the China Patent Office and entitled "MEMORY PAGING METHOD AND SYSTEM, AND STORAGE MEDIUM", which is incorporated herein by reference in its entirety.

TECHNICAL FIELD

The present application relates to the field of computer technology, and especially to a memory paging method and system, and a storage medium.

BACKGROUND

In the field of computer, direct pass-through technology introduces an input/output memory management unit (IOMMU), which sacrifices the sharing capability of a device to dedicate the device to a single client, so as to achieve the full functionality and optimal performance of the device. The IOMMU may connect a direct memory access (DMA) I/O bus and a memory of a host. The IOMMU translates virtual addresses accessed by a pass-through device into physical addresses, achieving access by the pass-through device to the memory of the host.

In certain application scenarios, such as hot/cold memory page replacement, it is necessary to replace an IOMMU page table. In a scenario of a device with direct pass-through, for an IOMMU which supports a Page fault function, Page fault may be employed to replace the IOMMU page table. However, for an IOMMU which does not support the Page fault function, the above way cannot be used to replace the page table. Therefore, how to achieve page table replacement for the IOMMU which does not support Page fault becomes an urgent technical problem to be solved in the art.

SUMMARY

Multiple aspects of the present application provide a memory paging method and system, and a storage medium, which are used for implementing page table replacement for an IOMMU which does not support Page fault.

An embodiment of the present application provides a memory paging method, comprising:
  determining a guest physical address needing page table update;
  determining, from a page table stored in an IOMMU of a host, a first host physical address corresponding to the guest physical address;
  determining a second host physical address from idle physical addresses stored in a host memory;
  copying data stored in the first host physical address to the second host physical address; and
  updating a host physical address that corresponds to the guest physical address and is recorded in the page table of the IOMMU to the second host physical address.

An embodiment of the present application further provides a computing system, comprising: a host and a virtual machine manager.

The host is deployed with a virtual machine, and is mounted with a pass-through device to which the virtual machine directly accesses; the host further comprises: an IOMMU; a page table stored in the IOMMU records a correspondence relationship between guest physical addresses of virtual machines and host physical addresses; and the pass-through device accesses a memory of the host based on the correspondence relationship between the guest physical addresses of the virtual machines and the host physical addresses.

The virtual machine manager is used for: determining a guest physical address needing page table update; determining, from the page table stored in the IOMMU, a first host physical address corresponding to the guest physical address; determining a second host physical address from idle physical addresses in the memory of the host; copying data stored in the first host physical address to the second host physical address; and updating a host physical address that corresponds to the guest physical address and is recorded in the page table of the IOMMU to the second host physical address.

An embodiment of the present application further provides a computer-readable storage medium storing computer instructions that, when executed by one or more processors, cause the one or more processors to execute the steps in the above memory paging method.

An embodiment of the present application further provides a computer program product, comprising: a computer program that, when executed by a processor, causes the processor to execute the steps in the above memory paging method.

In the embodiments of the present application, for an IOMMU which does not support Page fault, a VMM may determine a GPA needing page update, and determine a first HPA corresponding to the GPA from a page table stored in the IOMMU of a host; determine a second HPA for replacing the first HPA from idle physical addresses stored in a host memory; further, copy data stored in the first HPA to the second HPA; and update an HPA that corresponds to the GPA needing update and is recorded in the page table of the IOMMU to the second HPA, and thus, page table replacement is implemented for the IOMMU which does not support Page fault.

BRIEF DESCRIPTION OF THE DRAWINGS

The drawings described here are used to provide a further understanding of the present application, and constitute a part of the present application. The illustrative embodiments of the present application and descriptions thereof are used to explain the present application, and do not constitute an improper limitation of the present application. In the drawings.

DETAILED DESCRIPTION

Figure 1:
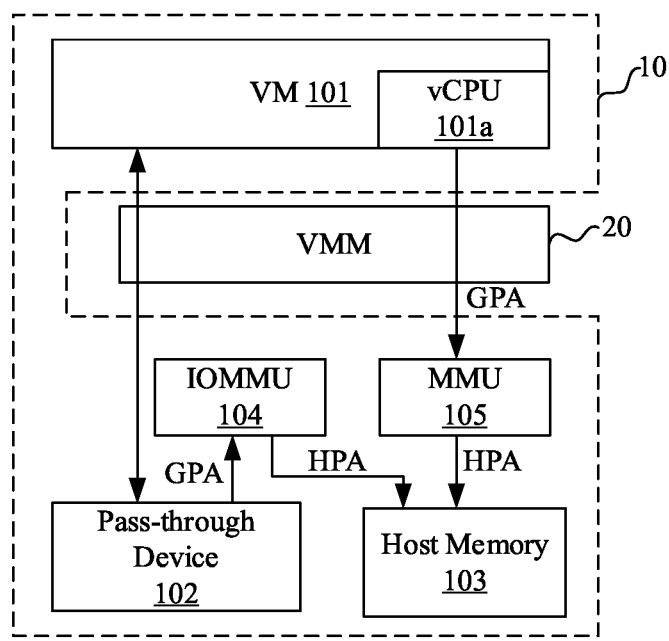
FIG. 1 is a structural schematic diagram of a computing system provided in an embodiment of the present application.

In order to enable the purposes, technical solutions and advantages of the present application more explicit, the technical solutions of the present application will be described clearly and completely below with reference to specific embodiments and the corresponding drawings of the present application. Obviously, the described embodiments are only some of the embodiments of the present application, rather than all the embodiments. Based on the embodiments of the present application, all other embodiments obtained by those of ordinary skill in the art without any creative labor should fall within the scope of protection of the present application.

In the embodiments of the present application, for an IOMMU which does not support Page fault, a VMM may determine a GPA needing a page update, and determine a first HPA corresponding to the GPA from a page table stored in the IOMMU of a host; determine a second HPA for replacing the first HPA from idle physical addresses stored in a host memory; further, copy data stored in the first HPA to the second HPA; and update an HPA that corresponds to the GPA needing update and is recorded in the page table of the IOMMU to the second HPA, and thus, page table replacement is implemented for the IOMMU which does not support Page fault.

The technical solutions provided in various embodiments of the present application will be explained in detail below with reference to the drawings.

It should be noted that the same reference numerals denote one and the same object in the following drawings and embodiments. Therefore, once a certain object is defined in one drawing or embodiment, it does not need to be further discussed in subsequent drawings and embodiments.

FIG. 1 is a structural schematic diagram of a computing system provided in an embodiment of the present application. As shown in FIG. 1, the computing system comprises: a host 10 and a virtual machine manager (VMM) 20.

In this embodiment, host 10 refers to a computer device with functions such as computing, storage, and communication, which may be, for example, a server device. For example, host 10 may be a single server device, or may be a cloud-based server array, or the like. Of course, host 10 may also be a terminal device such as a mobile phone, a tablet computer, a personal computer, or a wearable device, etc.

In this embodiment, host 10 is deployed with a virtual machine (VM) 101. Virtual machine 101 may also be referred to as a guest of host 10. VM 101 has independent CPU, memory, network, disk, or the like. The CPU corresponding to virtual machine 101 may also be referred to as a virtual machine CPU, namely vCPU 101a shown in FIG. 1.

In this embodiment, VMM 20 refers to a logical node that manages virtual machines, and may be deployed on host 10, or on other physical machines in communication with host 10. For an embodiment in which VMM 20 is deployed on host 10, VMM 20 may run on a CPU of host 10 (not shown in FIG. 1). VMM 20 may perform task scheduling, load balancing, status monitoring, or the like on VM 101.

In pass-through technology, VM 101 may directly access I/O hardware mounted on host 10 without passing through VMM 20. In this way, an I/O operation path of VM 101 is almost the same as an I/O path in a non-virtualization environment. The I/O hardware is a pass-through device 102. Pass-through device 102 refers to an I/O hardware device mounted on host 10, which may comprise: a network card, a storage medium, or the like. The storage medium may be a persistent storage medium such as a magnetic disk or a hard disk.

For pass-through device 102, it may access a memory of host 10, namely a host memory 103, by means of direct memory access (DMA). For the DMA, there is a data path between pass-through device 102 and host memory 103 to achieve direct data transmission between pass-through device 102 and host memory 103. In a process of the data transmission between pass-through device 102 and host memory 103, the CPU of host 10 is not needed to participate.

In virtualization technology, an operating system (guest OS) running on VM 101 usually does not know a physical memory address of a host it accesses, which may also be referred to as a host physical address (HPA). If there is a desire to perform DMA operations, it may be possible to destroy the memory. Because pass-through device 102 may be only aware of the physical memory address of the virtual machine, which may also be referred to as a guest physical address (GPA), and does not know a mapping relationship between GPA and HPA. Therefore, an IOMMU 104 is introduced in pass-through technology.

IOMMU 104 may be communicatively connected between pass-through device 102 and host memory 103. Optionally, IOMMU 104 may communicatively connect pass-through device 102 and host memory 103 through a serial interface bus. The serial interface bus may be a PCI interface bus, a PCIe interface bus, or the like. IOMMU 104 may ensure that pass-through device 102 can access host memory 103 when performing DMA operations.

For a host without IOMMU 104, pass-through device 102 may access the entire memory address space of host 10 by means of DMA. For a host equipped with IOMMU 104, a CPU 101a of the virtual machine may allocate a GPA accessible by pass-through device 102, and VMM 20 allocates a corresponding HPA to the GPA. IOMMU 104 may maintain a mapping table between GPA and HPA, which may also be referred to as a page table. The page table records the mapping relationship between GPA and HPA. When pass-through device 102 accesses the memory of host 10 by means of DMA, VMM 20 may capture a DMA request sent by pass-through device 102 and pass-through the DMA request to IOMMU 104. IOMMU 104 may acquire a GPA to be accessed from the DMA request. Afterwards, the GPA to be accessed is matched in the page table stored in IOMMU 104 to obtain an HPA corresponding to the GPA to be accessed. For pass-through device 102, the memory space corresponding to host memory 103 may be accessed through the HPA corresponding to the GPA to be accessed.

In some application scenarios, there is a page table replacement demand for the page table stored in IOMMU 104. For example, when an HPA(s) corresponding to one or some GPAs changes, the page table stored in IOMMU 104 needs to be updated. For example, in a scenario of hot/cold memory page replacement, if a hot page is not used for a long time, it may be converted into a cold page and allocated to a DMA request. This is because for the DMA request, contiguous memory pages are needed, and thus cold page needs to be allocated. The above cold page means that this idle page is no longer in the cache, while the hot page means that this idle page is still in the cache.

For a scenario where the page table replacement needs to be performed for IOMMU 104, for an IOMMU which supports Page fault, age fault may be employed to replace an IOMMU page table. VMM 20 may reclaim a physical memory from the page table stored in IOMMU when necessary, namely reclaiming a memory corresponding to the HPA; and store data stored in the physical memory in a Paging File in a hard disk, which can ensure that the data will not be lost, and a physical memory page released at the same time is for use by other processes.

When pass-through device 102 needs to access the reclaimed memory again, VMM 20 may look up data from the Paging File, allocate an idle physical memory page, write the data into the physical memory page, then map an HPA of the new physical memory page to a virtual space corresponding to a GPA, on which a process needs to operate, and write it into the page table stored in the IOMMU to obtain the data and memory space needed for access. An HPA corresponding to one physical memory page is added to the page table stored in the OMMU, which is one Page Fault.

For an IOMMU which does not support Page fault, an embodiment of the present application provides a new memory paging method, and the major implementation is as follows.

In the embodiments of the present application, VMM 20 may determine a GPA needing page update. In the embodiments of the present application, there is no limitation of a specific implementation to determine a GPA(A) needing page table update by VMM 20. In some embodiments, VMM 20 may acquire a page table update request. The page table update request contains the GPA (A) needing page table update. The page table update request acquired by VMM 20 may be a page table update request provided by a client corresponding to VM 101. For example, in the field of cloud computing, a user may apply for virtual machine resources from a cloud server, and VM 101 is a virtual machine allocated by the cloud server to the user. Correspondingly, the client is a computing device on a user side that applies for this virtual machine. Alternatively, the page table update request may also be a page table update request sent by an operation and maintenance-side device of the cloud server; and so on.

Further, VMM 20 may acquire a GPA (denoted as A) needing page table update from the page table update request. Further, VMM 20 may determine, from the page table stored in IOMMU 104, an HPA corresponding to the GPA (A) needing page table update, which is denoted as Pa. Specifically, VMM 20 may match the GPA (A) needing page table update in the page table stored in IOMMU 104, so as to obtain the HPA (Pa) corresponding to the GPA (A) needing page table update.

Since the HPA corresponding to the GPA (A) needing page table update is an HPA which needs to be replaced, VMM 20 may also determine another HPA, denoted as Pr, from idle physical addresses of host memory 103. In the embodiments of the present application, in order to facilitate description and distinction, the HPA corresponding to the GPA (A) needing page table update is defined as a first HPA (Pa); and the another HPA as determined for replacing the first HPA is defined as a second HPA (denoted as Pr).

Optionally, VMM 20 may select any idle physical address from the idle physical addresses in host memory 103 as the second HPA (Pr). Alternatively, VMM 20 may determine the second HPA (Pr) from the idle physical addresses of host memory 103 according to a set memory page replacement algorithm. The memory page replacement algorithm includes but is not limited to: optimal replacement algorithm (OPT), first-in-first-out algorithm (FIFO), least recently used algorithm (LRU), clock replacement algorithm (CLOCK) or improved clock replacement algorithm, or the like.

The optimal replacement algorithm (OPT) refers to an algorithm where a selected page is a memory page that will never be used later, or will not be accessed for the longest time, and an HPA corresponding to this memory page is used as the second HPA (Pr).

The first-in-first-out algorithm (FIFO) refers to an algorithm where memory pages entering a memory are arranged in one queue in an order of entry, and an HPA corresponding to a memory page that enters the memory first is selected as the second HPA (Pr).

The least recently used algorithm (LRU) refers to an algorithm where a selected memory page is a memory page that is recently unused; and an HPA corresponding to the selected memory page is determined as the second HPA (Pr). Optionally, an access field may be used to record a time elapsed since the memory page was last accessed. When the page table needs to be replaced, a corresponding memory page with the largest time value is selected from idle memory pages as the recently unused memory page.

The clock replacement algorithm (CLOCK) refers to an algorithm where memory pages in a memory are linked into a circular queue through a link pointer, and an access bit field is added. When a certain memory page enters the memory for the first time, an access bit field corresponding to this page is set to 1; and when this page is subsequently accessed, the access bit field will also be set to 1. In this method, when memory paging is needed, the operating system scans a buffer to find a memory page with the access bit field set to 0, and uses an HPA corresponding to the first memory page as scanned with the access bit field set to 0 as the second HPA(Pr).

The ways of determining HPA as listed in the above embodiments are only illustrative, and do not constitute a limitation.

After determining the second HPA (Pr) which replaces the first HPA (Pa), VMM 20 may copy data stored in the first HPA (Pa) to the second HPA (Pr); and update an HPA that corresponds to the GPA (A) needing page table update and is recorded in the page table of IOMMU 104 to the second HPA (Pr).

In the computing system provided in this embodiment, for an IOMMU which does not support Page fault, a VMM may determine a GPA needing page update, and determine a first HPA corresponding to the GPA from a page table stored in the IOMMU of a host; determine a second HPA for replacing the first HPA from idle physical addresses stored in a host memory; further, copy data stored in the first HPA to the second HPA; and update an HPA that corresponds to the GPA needing update and is recorded in the page table of the IOMMU to the second HPA, and thus, page table replacement is implemented for the IOMMU which does not support Page fault.

Further, after replacing the IOMMU page table, the page table of IOMMU 104 may also be flushed to an input/output translation lookaside buffer (IOTLB).

The IOTLB has a fixed number of space slots for storing a page table that maps virtual addresses to physical addresses, namely the above page table of IOMMU 104. A search keyword thereof is a physical memory address of a virtual machine, and a search result is a host physical address (HPA). If a guest physical address (GPA) in the DMA request exists in the IOTLB, the address translation rate may be improved, and then the obtained host physical address (HPA) may be used to access the host memory.

In the field of pass-through technology, as shown in FIG. 1, host 10 not only supports access of pass-through device 104 to the host memory, but also supports access of a CPU (vCPU 101*a*) of the virtual machine to the host memory. vCPU 101*a* may apply for a virtual address space (VAS) of the virtual machine, namely a GPA. Since the VAS is not a real physical memory space, the operating system must map the VAS to a physical memory space, so that the process can store a process context.

A memory management unit (MMU) 105 may be provided for host 10. A page table maintained by MMU 105 records a correspondence relationship between guest physical addresses and host physical addresses. MMU 105 may convert the GPA accessed by vCPU 101*a* into an HPA based on the correspondence relationship between guest physical addresses and host physical addresses as recorded in the page table. In this way, vCPU 101*a* may access a memory space corresponding to the HPA.

In the embodiments of the present application, when IOMMU 104 updates the page table, the page table in MMU 105 needs to be updated synchronously. This is because if update is performed for the HPA in updating the page table of IOMMU 104, the page table in MMU 105 is not updated synchronously, which will lead to a result that the GPA (A) needing page table update corresponds to different HPAs in the page table of IOMMU 104 and the page table in MMU 105. After IOMMU 104 updates the HPA in the page table, the data stored in the original HPA (first HPA) has been updated to the replaced HPA (second HPA), and the original HPA has been released or has stored other data, which will lead to a result that MMU 105 will still access the first HPA (Pa) when accessing the above GPA needing page update, resulting in an access to a missing page, or an error.

Based on the above analysis, in the embodiments of the present application, after determining the GPA (A) needing page table update, VMM 20 may also delete the GPA needing update from the page table of MMU 105; and block vCPU 101*a* from accessing the GPA(A) needing page table update.

Since MMU 105 supports Page fault, VMM 20 may block vCPU 101*a* from accessing the GPA (A) needing page table update when executing a Page fault procedure. Specifically, when VMM 20 acquires an access request of vCPU 101*a* for the GPA(A) needing page table update, it may query the page table of MMU 105 by utilizing the GPA(A) needing page table update. Since the GPA (A) needing page table update has been deleted from the page table of MMU 105, the HPA corresponding to the GPA (A) needing page table update cannot be found in the page table of MMU 105, which may trigger the Page fault procedure of MMU 105. That is, the Page fault procedure is executed in a case that the HPA corresponding to the GPA (A) needing page table update is not found in the page table of MMU 105. In the embodiments of the present application, in order to block vCPU 101*a* from accessing the GPA (A) needing page table update, locking processing may be performed for page table replacement of MMU 105 in a process of executing the Page fault procedure, thereby blocking the access of vCPU 101*a* to the GPA(A) needing page table update. If no locking processing is performed for the page table replacement of MMU 105, when MMU 105 executes the Page fault procedure, an HPA will be reallocated for the GPA needing update as recorded in the page table of MMU 105, which is very likely to lead to an inconsistency of HPAs corresponding to the same GPA in the MMU 105 page table and the IOMMU 104 page table.

Further, after completing page table update in IOMMU 104, the above GPA needing update may be added to the page table of MMU 105, and the HPA corresponding to the GPA needing update is updated to the second HPA (Pr). Further, the access of vCPU 101*a* to the above GPA needing update may be restored.

In some embodiments, in a process of the page table update in the IOMMU, there may be a data update to the data stored in the HPA corresponding to the GPA(A) needing page table update. VMM 20 is imperceptible to user's update to the data stored in the HPA corresponding to the GPA (A) needing page table update. Therefore, VMM 20 cannot determine whether the data update occurs after or during the page table update in the IOMMU. If an update is generated to the data stored in the HPA corresponding to the GPA (A) needing page table update, which occurs after the data stored in the first HPA (Pa) has been copied to the second HPA (Pr), but before the HPA that corresponds to the GPA (A) needing page table update and is recorded in the page table of IOMMU 104 is updated to the second HPA (Pr), then the update to the data in the HPA corresponding to the GPA (A) needing page table update is an update to the data stored in the first HPA (Pa), which leads to a result that the data stored in the second HPA (Pr) is data before the update, and thus synchronous update of data cannot be achieved.

In order to solve the above problem, in some embodiments of the present application, a first HPA (Ps) for temporarily storing a snapshot of the data in the second HPA (Pr) may also be applied for. Specifically, the first HPA (Ps) may be determined from idle physical addresses of the host memory; and after the data stored in the first HPA (Pa) is copied to the second HPA (Pr), data stored in the second HPA (Pr) is copied to the first HPA (Ps), that is, the data stored in the first HPA (Ps) is the snapshot of the data stored in the second HPA (Pr).

Further, it may be compared whether the data stored in the first HPA (Pa) is the same as the data stored in the second HPA (Pr). Optionally, whether the data stored in the first HPA (Pa) is the same as the data stored in the second HPA (Pr) may be compared byte by byte in byte units. If the data stored in the first HPA (Pa) is the same as the data stored in the second HPA (Pr), this indicates that during the IOMMU page table update, the data stored in the HPA corresponding to the GPA (A) needing page table update has not been updated. Therefore, in the case that the data stored in the first HPA (Pa) is the same as the data stored in the second HPA (Pr), a memory space corresponding to a third host physical address may be released. Further, the above GPA needing update may also be added to the page table of MMU 105, and the HPA corresponding to the GPA needing update is updated to the second HPA (Pr). Further, the access of vCPU 101*a* to the GPA needing update may be restored.

If different data exists between the data stored in the first HPA (Pa) and the data stored in the second HPA (Pr), this indicates that during the IOMMU page table update, an update occurs to the data stored in the HPA corresponding to the GPA (A) needing page table update. Since VMM 20 is imperceptible to the time when the data stored in the HPA is updated, it is also necessary in the embodiments of the present application to determine the time when an update occurs to the data stored in the HPA corresponding to the GPA(A) needing page table update. If an update to the data stored in the HPA corresponding to the GPA (A) needing page table update occurs after the first HPA (Pa) recorded in the page table of IOMMU 104 is updated to the second HPA (Pr), this indicates that the HPA where the data update occurs is the second HPA (Pr). Since the HPA that corresponds to the GPA (A) needing page table update and is recorded in the page table of IOMMU 104 is already the second HPA (Pr), when pass-through device 102 accesses the GPA (A) needing page table update, it accesses the memory space of the second HPA (Pr), that is, data after the update is accessed, and thus access accuracy is higher.

Correspondingly, if an update to the data stored in the HPA corresponding to the GPA (A) needing page table update occurs after the data in the first HPA (Pa) is copied to the second HPA (Pr), but before the first HPA (Pa) recorded in the page table of IOMMU 104 is updated to the second HPA (Pr), this indicates that the HPA where the data update occurs is the first HPA (Pa), while the data stored in the second HPA (Pr) is data before the update. In this way, after the first HPA (Pa) recorded in the page table of IOMMU 104 is updated to the second HPA (Pr), when pass-through device 102 accesses the GPA (A) needing page table update, it accesses the memory space of the second HPA (Pr), that is, the data before the update is accessed, and thus access accuracy is lower.

Based on the above analysis, in the embodiments of the present application, in a case that different data exists between the data stored in the first HPA (Pa) and the data stored in the second HPA (Pr), a logical address where data is different may be determined. The logical address refers to a relative address of data that is different in the HPA. For example, data at an Nth byte is not identical.

In this embodiment, for a first logical address b where data is different, it may be determined whether data Pr (b) at the first logical address b from the data stored in the second HPA (Pr) is the same as data Ps (b) at the first logical address b from the data stored in the first HPA (Ps). If a determination result is no, that is, Pr(b) is not identical to Ps(b), this indicates that data update occurs in the second HPA (Pr). Since pass-through device 102 accesses the memory space of the second HPA (Pr), namely the data after the update, when accessing the GPA (A) needing page table update, a memory space corresponding to the first HPA (Ps) may be released in a case that Pr (b) is not identical to Ps (b). Further, the above GPA needing update may also be added to the page table of MMU 105, and the HPA corresponding to the GPA needing update is updated to the second HPA (Pr). Further, the access of vCPU 101a to the GPA needing update may be restored.

Correspondingly, in the case that different data exists between the data stored in the first HPA (Pa) and the data stored in the second HPA (Pr), if Pr (b) is identical to Ps (b), since Pa (b) is not identical to Ps (b), this indicates that data update occurs in the first HPA (Pa), that is, the data update occurs after the data in the first HPA (Pa) is copied to the second HPA (Pr), but before the first HPA (Pa) recorded in the page table of IOMMU 104 is updated to the second HPA (Pr). Thus, in the case that different data exists between the data stored in the first HPA (Pa) and the data stored in the second HPA (Pr), if Pr (b) is identical to Ps (b), data at the first logical address b from the data stored in the second HPA (Pr) is updated to data at the first logical address b from the data stored in the first host physical address, that is Pr (b) is updated to Pa (b). Further, the memory space corresponding to the first HPA (Ps) may be released. Further, the above GPA needing update may also be added to the page table of MMU 105, and the HPA corresponding to the GPA needing update is updated to the second HPA (Pr). Further, the access of vCPU 101a to the GPA needing update may be restored.

In the case that different data exists between the data stored in the first HPA (Pa) and the data stored in the second HPA (Pr), logical steps as performed may be completed by an atomic instruction. In a process of executing the atomic instruction, an operation will not be interrupted by a thread scheduling mechanism; once such operation starts, it will run until an end without any context switch (to another thread) in between. In this way, it may ensure that the execution of logical steps will not be interrupted in the case that different data exists between the data stored in the first HPA (Pa) and the data stored in the second HPA (Pr), and it may also ensure that the data in the second HPA (Pr) will not be updated again in a process of executing the logical steps. The atomic instruction may ensure a page table modification time sequence when the IOMMU page table is updated. When DMA write requests of pass-through device 102 are concurrent, it may still ensure atomicity of the logical steps as performed in the case that different data exists between the data stored in the first HPA (Pa) and the data stored in the second HPA (Pr).

In order to ensure the accuracy of the logical steps as executed in the case that different data exists between the data stored in the first HPA (Pa) and the data stored in the second HPA (Pr), an embodiment of the present application may make a further limitation that pass-through device 102 can only perform write operation for each HPA once at most. This is because if pass-through device 102 may perform write operation for the HPA multiple times, and if multiple updates occur to the data stored in the HPA corresponding to the GPA(A) needing update, it is assumed that one update to the data stored in the HPA corresponding to the GPA(A) occurs after the data in the first HPA (Pa) is copied to the second HPA (Pr) but before the first HPA (Pa) recorded in the page table of IOMMU 104 is updated to the second HPA (Pr), and two updates occur after the first HPA (Pa) recorded in the page table of IOMMU 104 is updated to the second HPA (Pr). For the one data update after the data in the first HPA (Pa) is copied to the second HPA (Pr) but before the first HPA (Pa) recorded in the page table of IOMMU 104 is updated to the second HPA (Pr), the update is occurred to the data in the first HPA (Pa). For the two data updates after the first HPA (Pa) recorded in the page table of IOMMU 104 is updated to the second HPA (Pr), the update is occurred to the data in the second HPA (Pr). It is assumed that data at a logical address c is updated in these 3 times of data update. It is assumed that an updated Pa (c) is equal to 3; and the data at logical address c in the second HPA (Pr) is updated to the original data after the two times of update. For example, the original data at logical address c in the second HPA (Pr) meets Pr (c)=1; after the first update, Pr (c)=2; and after the second update, Pr (c)=1. The data stored in the third HPA (Ps) is a snapshot of the original data stored in the second HPA (Pr), namely Pr (c)=1. In this way, Ps (c) is not equal to Pa (c), but Ps (c) is equal to Pr (c), and then a step of updating Pr (c) to Pa (c) should be executed. If Pr (c) is updated to Pa (c), an error will be caused to Pr (c), because data update to logical address c of the second HPA (Pr) is later than that to logical address c of the first HPA (Pa). Therefore, in the embodiments of the present application, there is a limitation that pass-through device 102 can only perform write operation for each HPA once at most. In this way, the above problem of data update error may be prevented.

In addition to the above system embodiments, the embodiments of the present application further provide corresponding memory paging methods. An illustrative description will be given below with reference to specific embodiments.

Figure 2:
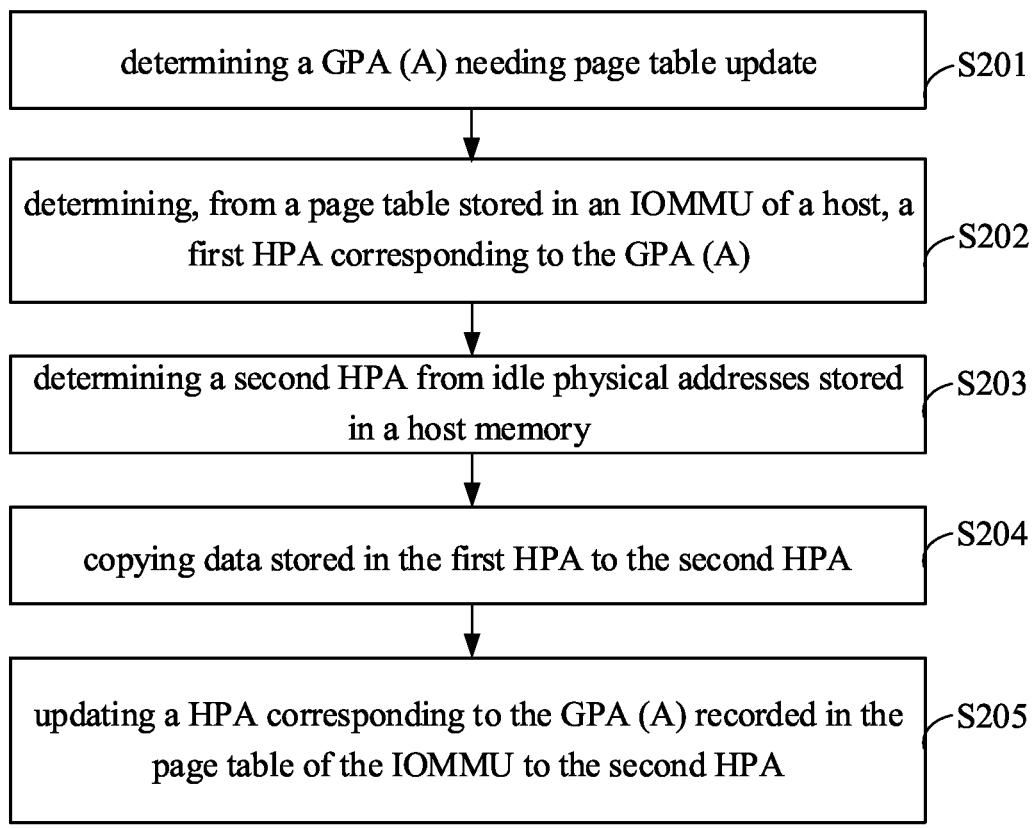
FIG. 2 and FIG. 3 are schematic flow charts of memory paging methods provided in the embodiments of the present application.

FIG. 2 is a flow chart of a memory paging method provided in an embodiment of the present application. As shown in FIG. 2, the memory paging method comprises:

S201, determining a GPA (A) needing page table update;

S202, determining, from a page table stored in an IOMMU of a host, a first HPA corresponding to the GPA (A);

S203, determining a second HPA from idle physical addresses stored in a host memory;

S204, copying data stored in the first HPA to the second HPA; and

S205, updating an HPA that corresponds to the GPA (A) and is recorded in the page table of the IOMMU to the second HPA.

In this embodiment, for an IOMMU which does not support Page fault, at step S201, a GPA needing a page update may be determined. In the embodiments of the present application, there is no limitation of a specific implementation of determining a GPA(A) needing page table update. In some embodiments, a page table update request may be acquired. Further, a GPA (denoted as A) needing page table update may be acquired from the page table update request.

Further, at step S202, a first HPA corresponding to the GPA (A) needing page table update may be determined from the page table stored in the IOMMU, which is denoted as Pa.

Since the HPA corresponding to the GPA (A) needing page table update is an HPA which needs to be replaced, at step S203, a second HPA may also be determined from idle physical addresses of the host memory, which is denoted as Pr. Regarding a specific implementation of step S203, reference may be made to the relevant content of the above system embodiments, which will not be repeated here.

After determining the second HPA (Pr) for replacing the first HPA (Pa), at step S204, data stored in the first HPA (Pa) may be copied to the second HPA (Pr); and at step S205, an HPA that corresponds to the GPA (A) needing page table update and is recorded in the page table of the IOMMU is updated to the second HPA (Pr).

In this embodiment, for an IOMMU which does not support Page fault, a VMM may determine a GPA needing page update, and determine a first HPA corresponding to the GPA from a page table stored in the IOMMU of a host; determine a second HPA for replacing the first HPA from idle physical addresses stored in a host memory; further, copy data stored in the first HPA to the second HPA; and update an HPA that corresponds to the GPA needing update and is recorded in the page table of the IOMMU to the second HPA, and thus, page table replacement is implemented for the IOMMU which does not support Page fault.

Further, after replacing the IOMMU page table, the page table of the IOMMU may also be flushed to an IOTLB. In this way, when a pass-through device accesses the host memory, a DMA request sent by the pass-through device may be matched first in the IOTLB. If a guest physical address (GPA) in the DMA request exists in the IOTLB, the address translation rate may be improved, and then an obtained host physical address (HPA) may be used to access the host memory.

In the field of pass-through technology, the host not only supports access of the pass-through device to the host memory, but also supports access of a CPU (vCPU) of the virtual machine to the host memory. A memory management unit (MMU) may be provided for the host. A page table maintained by the MMU records a correspondence relationship between guest physical addresses and host physical addresses. The MMU may convert the GPA accessed by the vCPU into an HPA based on the correspondence relationship between guest physical addresses and host physical addresses as recorded in the page table. In this way, the vCPU may access a memory space corresponding to the HPA.

In the embodiments of the present application, when the IOMMU updates the page table, a page table of the MMU needs to be updated synchronously. Therefore, after step S201, the GPA needing update may also be deleted from the page table of the MMU; and the access of the vCPU to the GPA (A) needing page table update may be blocked.

Since the MMU supports Page fault, the vCPU may be blocked from accessing the GPA (A) needing page table update when executing a Page fault procedure. Specifically, when the VMM acquires an access request of the vCPU for the GPA(A) needing page table update, it may query the page table of the MMU by utilizing the GPA(A) needing page table update. Since the GPA (A) needing page table update has been deleted from the page table of the MMU, the HPA corresponding to the GPA (A) needing page table update cannot be queried in the page table of the MMU, which may trigger the Page fault procedure of the MMU. That is, the Page fault procedure is executed in a case that the HPA corresponding to the GPA (A) needing page table update is not found in the page table of the MMU. In the embodiments of the present application, in order to block the vCPU from accessing the GPA (A) needing page table update, locking processing may be performed for page table replacement of the MMU in a process of executing the Page fault procedure, thereby blocking the access of the vCPU to the GPA(A) needing page table update.

Further, after completing page table update in the IOMMU, the above GPA needing update may be added to the page table of the MMU, and the HPA corresponding to the GPA needing update is updated to the second HPA (Pr). Further, the access of the vCPU to the above GPA needing update may be restored.

In some embodiments, in a process of the page table update in the IOMMU, there may be a data update to the data stored in the HPA corresponding to the GPA(A) needing page table update. The VMM is imperceptible to user's update to the data stored in the HPA corresponding to the GPA (A) needing page table update. Therefore, VMM 20 cannot determine whether the data update occurs after or during the page table update in the IOMMU. If an update is generated to the data stored in the HPA corresponding to the GPA (A) needing page table update, which occurs after the data stored in the first HPA (Pa) has been copied to the second HPA (Pr), but before the HPA that corresponds to the GPA (A) needing page table update and is recorded in the page table of the IOMMU is updated to the second HPA (Pr), then the update to the data in the HPA corresponding to the GPA (A) needing page table update is an update to the data stored in the first HPA (Pa), which leads to a result that the data stored in the second HPA (Pr) is data before the update, and thus synchronous update of data cannot be achieved.

In order to solve the above problem, in some embodiments of the present application, a first HPA (Ps) for temporarily storing a snapshot of the data in the second HPA (Pr) may also be applied for. Specifically, the first HPA (Ps) may be determined from idle physical addresses of the host memory; and after the data stored in the first HPA (Pa) is copied to the second HPA (Pr), data stored in the second HPA (Pr) is copied to the first HPA (Ps), that is, the data stored in the first HPA (Ps) is the snapshot of the data stored in the second HPA (Pr).

Further, it may be compared whether the data stored in the first HPA (Pa) is the same as the data stored in the second HPA (Pr). Optionally, whether the data stored in the first HPA (Pa) is the same as the data stored in the second HPA (Pr) may be compared byte by byte in byte units. If the data stored in the first HPA (Pa) is the same as the data stored in the second HPA (Pr), this indicates that during the IOMMU page table update, the data stored in the HPA corresponding to the GPA (A) needing page table update has not been updated. Therefore, in the case that the data stored in the first HPA (Pa) is the same as the data stored in the second HPA (Pr), a memory space corresponding to a third host physical address may be released. Further, the above GPA needing update may also be added to the page table of the MMU, and the HPA corresponding to the GPA needing update is updated to the second HPA (Pr). Further, the access of the vCPU to the GPA needing update may be restored.

If different data exists between the data stored in the first HPA (Pa) and the data stored in the second HPA (Pr), this indicates that during the IOMMU page table update, an update occurs to the data stored in the HPA corresponding to the GPA (A) needing page table update. In the embodiments of the present application, in a case that different data exists between the data stored in the first HPA (Pa) and the data stored in the second HPA (Pr), a logical address where data is different may be determined. The logical address refers to a relative address of the data that is different in the HPA. For example, the data at an Nth byte is not identical.

In this embodiment, for a first logical address b where data is different, it may be determined whether data Pr (b) at the first logical address b from the data stored in the second HPA (Pr) is the same as data Ps (b) at the first logical address b from the data stored in the first HPA (Ps). If a determination result is no, that is, Pr(b) is not identical to Ps(b), this indicates that a data update occurs in the second HPA (Pr). Since pass-through device 102 accesses the memory space of the second HPA (Pr), namely the data after the update, when accessing the GPA (A) needing page table update, a memory space corresponding to the first HPA (Ps) may be released in a case that Pr (b) is not identical to Ps (b). Further, the above GPA needing update may also be added to the page table of the MMU, and the HPA corresponding to the GPA needing update is updated to the second HPA (Pr). Further, the access of the vCPU to the GPA needing update may be restored.

Correspondingly, in the case that different data exists between the data stored in the first HPA (Pa) and the data stored in the second HPA (Pr), if Pr (b) is identical to Ps (b), since Pa (b) is not identical to Ps (b), this indicates that a data update occurs in the first HPA (Pa), that is, the data update occurs after the data in the first HPA (Pa) is copied to the second HPA (Pr), but before the first HPA (Pa) recorded in the page table of the IOMMU is updated to the second HPA (Pr). Thus, in the case that different data exists between the data stored in the first HPA (Pa) and the data stored in the second HPA (Pr), if Pr (b) is identical to Ps (b), the data at the first logical address b from the data stored in the second HPA (Pr) is updated to the data at the first logical address b from the data stored in the first host physical address, that is Pr (b) is updated to Pa (b). Further, the memory space corresponding to the first HPA (Ps) may be released. Further, the above GPA needing update may also be added to the page table of the MMU, and the HPA corresponding to the GPA needing update is updated to the second HPA (Pr). Further, the access of the vCPU to the GPA needing update may be restored.

Figure 3:
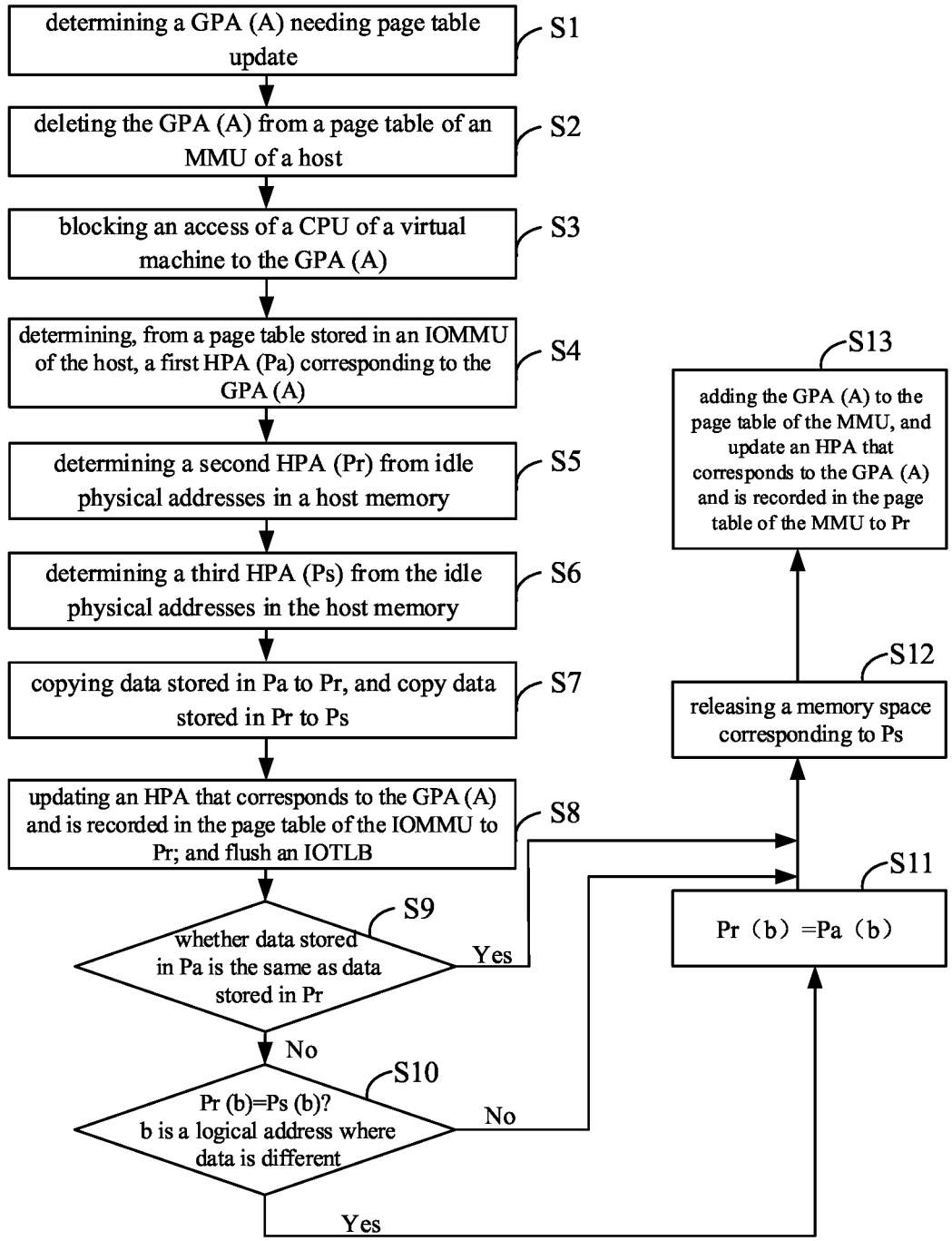

In order to clearly explain the specific implementation of the above memory paging method, the following is an exemplary description of the memory paging method with reference to the specific embodiment shown in FIG. 3. As shown in FIG. 3, the memory paging method mainly comprises:

S1, determining a GPA (A) needing page table update;
S2, deleting the GPA (A) needing page table update from a page table of an MMU of a host;
S3, blocking an access of a CPU of a virtual machine to the GPA (A);
S4, determining, from a page table stored in an IOMMU of the host, a first HPA (Pa) corresponding to the GPA (A);
S5, determining a second HPA (Pr) from idle physical addresses in a host memory;
S6, determining a third HPA (Ps) from the idle physical addresses in the host memory;
S7, copying data stored in the first HPA (Pa) to the second HPA (Pr), and copying data stored in the second HPA (Pr) to the third HPA (Ps);
S8, updating an HPA that corresponds to the GPA (A) and is recorded in the page table of the IOMMU to the second HPA (Pr); and flushing an IOTLB;
S9, comparing, in units of byte, whether the data stored in the first HPA (Pa) is the same as the data stored in the third HPA (Ps) byte by byte; and if they are the same, executing step S12, while if there exists a case of different data, executing step S10;
S10, for a first logical address b where data is different, determining whether data Pr (b) at the first logical address b from the data stored in the second HPA (Pr) is the same as data Ps (b) at the first logical address b from the data stored in the third HPA (Ps), namely determining whether Pr (b) is the same as Ps (b); and if a determination result is no, executing step S12, while if the determination result is yes, executing step S11;
S11, updating the data Pr (b) at the first logical address b from the data stored in the second HPA to the data Pa (b) at the first logical address b from the data stored in the first HPA; namely Pr (b)=Pa (b), and then executing step S12;
S12, releasing a memory space corresponding to the third HPA (Ps); and
S13, adding the GPA (A) to the page table of the MMU, and updating an HPA that corresponds to the GPA (A) and is recorded in the page table of the MMU to the second HPA (Pr).

In the above case that different data exists between the data stored in the first HPA (Pa) and the data stored in the second HPA (Pr), logical steps as performed, namely steps S10 and S11, may be completed by an atomic instruction. For specific reasons, reference may be made to the relevant content of the above system embodiments, which will not be repeated here.

In order to ensure the accuracy of logical steps S10 and S11 as executed in the case that different data exists between the data stored in the first HPA (Pa) and the data stored in the second HPA (Pr), an embodiment of the present application may make a further limitation that the pass-through device can only perform write operation for each HPA once at most. For specific reasons and analysis, reference may be made to the relevant content of the above system embodiments, which will not be repeated here.

It should be explained that an execution subject of each step of the methods provided in the above embodiments may be one and the same device, or the methods may be executed by different devices as execution subjects. For example, an execution subject of steps S201 and S202 may be device A; for another example, an execution subject of step S201 may be device A, while an execution subject of step S202 may be device B; and so on.

Additionally, some of the processes described in the above embodiments and drawings include a plurality of operations that appear in a particular order. However, it should be clearly understood that these operations may not be executed in the order in which they appear herein or may be executed in parallel. Serial numbers of operations, such as S201, S202, etc., are only used to distinguish different operations, and the serial numbers per se do not represent any execution order. Additionally, these processes may include more or fewer operations, and these operations may be executed in sequence or in parallel.

Correspondingly, an embodiment of the present application further provides a computer-readable storage medium storing computer instructions that, when executed by one or more processors, cause the one or more processors to execute the steps in the above memory paging methods.

An embodiment of the present application further provides a computer program product, comprising a computer program that, when executed by a processor, causes the processor to execute the steps in the above memory paging methods. In the embodiments of the present application, there is no limitation of an implementation form of the computer program. In some embodiments, the computer program product may be implemented as a virtual machine management program. Optionally, the virtual machine management program may run on the CPU of the host of the virtual machine.

It should be explained that descriptions herein, such as "first" and "second", are used to distinguish different messages, devices, modules, etc., and neither represent an order, nor limit the "first" and "second" to be of different types.

Those skilled in the art should clearly understand that the embodiments of the present application may be provided as a method, a system, or a computer program product. Therefore, the present application may employ a form of a complete hardware embodiment, a complete software embodiment, or an embodiment combining software and hardware aspects. Moreover, the present application may employ a form of a computer program product implemented on one or more computer-usable storage media containing computer-usable program codes (including but not limited to a disk storage, a CD-ROM, an optical storage, or the like).

The present application is described with reference to the flow charts and/or block diagrams of the methods, devices (systems), and computer program products according to the embodiments of the present application. It should be understood that each flow and/or block in the flow charts and/or block diagrams, as well as combinations of flows and/or blocks in the flow charts and/or block diagrams, may be implemented by computer program instructions. These computer program instructions may be provided to a processor of a general-purpose computer, a specialized computer, an embedded processor, or other programmable data processing device to produce one machine, such that the instructions executed by the processor of the computer or other programmable data processing device produce an apparatus for implementing functions designated in one or more flows in a flow chart and/or one or more blocks in a block diagram.

These computer program instructions may also be stored in a computer-readable memory that can guide a computer or other programmable data processing device to work in a particular way, such that instructions stored in this computer-readable memory produce an article of manufacture including an instruction apparatus that implements functions designated in one or more flows in a flow chart and/or one or more blocks in a block diagram.

These computer program instructions may also be loaded onto a computer or other programmable data processing device, such that a series of operating steps are executed on the computer or other programmable device to generate computer-implemented processing, thereby enabling the instructions executed on the computer or other programmable device to provide steps for implementing functions designated in one or more flows in a flow chart and/or one or more blocks in a block diagram.

In a typical configuration, the computing device comprises one or more processors (CPUs), input/output interface, network interface, and memory.

The memory may include a non-permanent storage such as a random access memory (RAM), and/or non-volatile memory forms such as a read-only memory (ROM) or a flash RAM, in a computer-readable medium. The memory is an example of the computer-readable medium.

A storage medium of a computer is a readable storage medium, also referred to as a readable medium. Readable storage media include both permanent and non-permanent, removable and non-removable media that may implement information storage by any method or technology. The information may be computer-readable instructions, data structures, modules of programs, or other data. Examples of the readable storage medium of a computer include, but are not limited to, a phase-change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storages, a cassette tape, a magnetic disk storage or other magnetic storage devices, or any other non-transmission media, which may be used to store information that may be accessed by a computing device. As defined herein, the computer-readable media do not include transitory media, such as modulated data signals and carrier waves.

It should also be explained that terms "comprise", "include" or any other variants thereof are intended to cover a non-exclusive inclusion, such that a process, method, commodity, or device comprising a series of elements not only comprises these elements, but also comprises other elements not expressly listed, or elements inherent to such process, method, commodity or device. Without further limitation, an element defined by the statement "comprising a . . . " does not exclude the presence of additional identical elements in a process, method, commodity or device that comprises the element.

Described above are merely embodiments of the present application, which are not intended to limit the present application. For those skilled in the art, various modifications and changes may be conducted to the present application. Any modifications, equivalent replacements, improvements, or the like made within the spirit and principles of the present application should be included within the scope of the claims of the present application.

What is claimed is:

1. A memory paging method, comprising:
   determining a guest physical address needing page table update;
   deleting the quest physical address from a page table of an MMU of a host;
   blocking an access of a CPU of a virtual machine to the guest physical address;
   determining, from a page table stored in an IOMMU of the host, a first host physical address corresponding to the guest physical address;
   determining a second host physical address from idle physical addresses stored in a host memory;
   copying data stored in the first host physical address to the second host physical address;
   updating a host physical address that corresponds to the guest physical address and is recorded in the page table of the IOMMU to the second host physical address;

determining a third host physical address from the idle physical addresses of the host memory;

after copying the data stored in the first host physical address to the second host physical address, copying data stored in the second host physical address to the third host physical address;

in a case that the data stored in the first host physical address is the same as data stored in the third host physical address, releasing a memory space corresponding to the third host physical address; and updating a host physical address that corresponds to the guest physical address and is recorded in the page table of the MMU to the second host physical address.

2. The method according to claim 1, wherein the blocking the access of the CPU to the guest physical address comprises:

acquiring an access request of the CPU for the guest physical address;

querying the page table of the MMU by utilizing the guest physical address;

executing a Page fault procedure in a case that a host physical address corresponding to the guest physical address is not found in the page table of the MMU; and performing locking processing for a page table replacement progress of the MMU in a process of executing the Page fault procedure, to block the access of the CPU to the guest physical address.

3. The method according to claim 1, further comprising:

in a case that different data exists between the data stored in the first host physical address and the data stored in the third host physical address, for a first logical address where data is different, determining whether data at the first logical address from the data stored in the second host physical address is the same as data at the first logical address from the data stored in the third host physical address;

if a determination result is that the data at the first logical address from the data stored in the second host physical address is not the same as the data at the first logical address from the data stored in the third host physical address, releasing the memory space corresponding to the third host physical address; and updating the host physical address that corresponds to the guest physical address and is recorded in the page table of the MMU to the second host physical address.

4. The method according to claim 3, further comprising:

if the determination result is that the data at the first logical address from the data stored in the second host physical address is the same as the data at the first logical address from the data stored in the third host physical address, updating the data at the first logical address from the data stored in the second host physical address to data at the first logical address from the data stored in the first host physical address;

releasing the memory space corresponding to the third host physical address; and updating the host physical address that corresponds to the guest physical address and is recorded in the page table of the MMU to the second host physical address.

5. The method according to claim 1, further comprising:

comparing, in units of byte, the data stored in the first host physical address with the data stored in the third host physical address.

6. The method according to claim 3, further comprising:

after updating the host physical address that corresponds to the guest physical address and is recorded in the page table of the MMU to the second host physical address, restoring the access of the CPU of the virtual machine to the guest physical address.

7. The method according to claim 1, wherein the determining the guest physical address needing page table update comprises:

acquiring a page table update request; and acquiring, from the page table update request, the guest physical address needing page table update.

8. A computing system, comprising: a host and a virtual machine manager; wherein the host is deployed with a virtual machine, and is mounted with a pass-through device to which the virtual machine directly accesses; the host further comprises: an IOMMU; a page table stored in the IOMMU records a correspondence relationship between guest physical addresses of virtual machines and host physical addresses; and the pass-through device accesses a memory of the host based on the correspondence relationship between the guest physical addresses of the virtual machines and the host physical addresses; and the virtual machine manager is used for: determining a guest physical address needing page table update; deleting the guest physical address from a page table of an MMU of the host; blocking an access of a CPU of the virtual machine to the guest physical address; determining, from the page table stored in the IOMMU, a first host physical address corresponding to the guest physical address; determining a second host physical address from idle physical addresses in the memory of the host; copying data stored in the first host physical address to the second host physical address; updating a host physical address that corresponds to the guest physical address and is recorded in the page table of the IOMMU to the second host physical address; determining a third host physical address from the idle physical addresses of the memory of the host; after copying the data stored in the first host physical address to the second host physical address, copying data stored in the second host physical address to the third host physical address; in a case that the data stored in the first host physical address is the same as data stored in the third host physical address, releasing a memory space corresponding to the third host physical address; and updating a host physical address that corresponds to the quest physical address and is recorded in the page table of the MMU to the second host physical address.

9. A non-transitory computer-readable storage medium storing computer instructions that, when executed by one or more processors, cause the one or more processors to perform operations of:

determining a guest physical address needing page table update;

deleting the guest physical address from a page table of an MMU of a host;

blocking an access of a CPU of a virtual machine to the guest physical address;

determining, from a page table stored in an IOMMU of the host, a first host physical address corresponding to the guest physical address;

determining a second host physical address from idle physical addresses stored in a host memory;

copying data stored in the first host physical address to the second host physical address;

updating a host physical address that corresponds to the guest physical address and is recorded in the page table of the IOMMU to the second host physical address;

determining a third host physical address from the idle physical addresses of the host memory;

after copying the data stored in the first host physical address to the second host physical address, copying data stored in the second host physical address to the third host physical address;

in a case that the data stored in the first host physical address is the same as data stored in the third host physical address, releasing a memory space corresponding to the third host physical address; and updating a host physical address that corresponds to the guest physical address and is recorded in the page table of the MMU to the second host physical address.

10. The non-transitory computer-readable storage medium according to claim 9, wherein the computer instructions, when executed by the one or more processors, cause the one or more processors to perform further operations of:

acquiring an access request of the CPU for the guest physical address;

querying the page table of the MMU by utilizing the guest physical address;

executing a Page fault procedure in a case that a host physical address corresponding to the guest physical address is not found in the page table of the MMU; and performing locking processing for a page table replacement progress of the MMU in a process of executing the Page fault procedure, to block the access of the CPU to the guest physical address.

11. The non-transitory computer-readable storage medium according to claim 9, wherein the computer instructions, when executed by the one or more processors, cause the one or more processors to perform further operations of:

in a case that different data exists between the data stored in the first host physical address and the data stored in the third host physical address, for a first logical address where data is different, determining whether data at the first logical address from the data stored in the second host physical address is the same as data at the first logical address from the data stored in the third host physical address;

if a determination result is that the data at the first logical address from the data stored in the second host physical address is not the same as the data at the first logical address from the data stored in the third host physical address, releasing the memory space corresponding to the third host physical address; and updating the host physical address that corresponds to the guest physical address and is recorded in the page table of the MMU to the second host physical address.

12. The non-transitory computer-readable storage medium according to claim 11, wherein the computer instructions, when executed by the one or more processors, cause the one or more processors to perform further operations of:

if the determination result is that the data at the first logical address from the data stored in the second host physical address is the same as the data at the first logical address from the data stored in the third host physical address, updating the data at the first logical address from the data stored in the second host physical address to data at the first logical address from the data stored in the first host physical address;

releasing the memory space corresponding to the third host physical address; and updating the host physical address that corresponds to the guest physical address and is recorded in the page table of the MMU to the second host physical address.

13. The non-transitory computer-readable storage medium according to claim 9, wherein the computer instructions, when executed by the one or more processors, cause the one or more processors to perform further operations of:

comparing, in units of byte, the data stored in the first host physical address with the data stored in the third host physical address.

14. The non-transitory computer-readable storage medium according to claim 11, wherein the computer instructions, when executed by the one or more processors, cause the one or more processors to perform further operations of:

after updating the host physical address that corresponds to the guest physical address and is recorded in the page table of the MMU to the second host physical address, restoring the access of the CPU of the virtual machine to the guest physical address.

15. The non-transitory computer-readable storage medium according to claim 9, wherein the computer instructions, when executed by the one or more processors, cause the one or more processors to perform further operations of:

acquiring a page table update request; and acquiring, from the page table update request, the guest physical address needing page table update.

* * * * *